US011401802B2

(12) United States Patent
Kim et al.

(10) Patent No.: US 11,401,802 B2
(45) Date of Patent: Aug. 2, 2022

(54) DETECTING A FLOOD FRONT IN A CROSS BED ENVIRONMENT

(71) Applicant: Halliburton Energy Services, Inc., Houston, TX (US)

(72) Inventors: Joonshik Kim, Singapore (SG); Burkay Donderici, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 547 days.

(21) Appl. No.: 16/334,989

(22) PCT Filed: Dec. 9, 2016

(86) PCT No.: PCT/US2016/065702
§ 371 (c)(1),
(2) Date: Mar. 20, 2019

(87) PCT Pub. No.: WO2018/106251
PCT Pub. Date: Jun. 14, 2018

(65) Prior Publication Data
US 2020/0018158 A1    Jan. 16, 2020

(51) Int. Cl.
*E21B 49/00* (2006.01)
*E21B 34/06* (2006.01)
(Continued)

(52) U.S. Cl.
CPC .............. *E21B 49/00* (2013.01); *E21B 34/06* (2013.01); *E21B 43/20* (2013.01); *E21B 47/113* (2020.05);
(Continued)

(58) Field of Classification Search
CPC ........ E21B 49/00; E21B 47/113; E21B 34/06; E21B 42/20; E21B 47/00; E21B 2200/02;
(Continued)

(56) References Cited

U.S. PATENT DOCUMENTS 4,313,164 A    1/1982  Regat
4,399,359 A *  8/1983  Fertl ....................... E21B 49/00
                                                250/269.6
(Continued)

FOREIGN PATENT DOCUMENTS

WO    2016060690 A1    4/2016

OTHER PUBLICATIONS

Glover (Archie's law—a reappraisal, Solid Earth, 7, 1157-1169, 2016 www.solid-earth.net/7/1157/2016/ doi: 10.5194/se-7-1157-2016) (Year: 2016).*

(Continued)

*Primary Examiner* — Daniel R Miller
*Assistant Examiner* — Christian T Bryant
(74) *Attorney, Agent, or Firm* — DeLizio, Peacock, Lewin & Guerra

(57) ABSTRACT

A measurement is made of a formation containing a flood front with a downhole electromagnetic sensor. A parameter of a cross-bedding model is calculated by fitting the measurement to the cross-bedding model. A rock petrophysical parameter is calculated using the cross-bedding model. The cross-bedding model is updated using the rock petrophysical parameter. The updated cross-bedding model is used to make an operational decision.

22 Claims, 8 Drawing Sheets

(51) Int. Cl.
*E21B 43/20* (2006.01)
*G01V 3/30* (2006.01)
*E21B 47/113* (2012.01)
*E21B 44/00* (2006.01)
*E21B 47/00* (2012.01)
*G01V 11/00* (2006.01)
*G01V 99/00* (2009.01)

(52) U.S. Cl.
CPC .............. *G01V 3/30* (2013.01); *G01V 99/005* (2013.01); *E21B 44/00* (2013.01); *E21B 47/00* (2013.01); *E21B 2200/02* (2020.05); *G01V 11/00* (2013.01); *G01V 2200/16* (2013.01)

(58) Field of Classification Search
CPC ........ E21B 44/00; G01V 3/30; G01V 99/005; G01V 11/00; G01V 2200/16
See application file for complete search history.

(56) References Cited

U.S. PATENT DOCUMENTS

| | | | | |
|---|---|---|---|---|
| 4,687,057 A | * | 8/1987 | Moore | ..................... E21B 49/00 166/252.3 |
| 6,886,632 B2 | * | 5/2005 | Raghuraman | ......... E21B 47/113 166/252.4 |
| 7,804,060 B2 | * | 9/2010 | Guo | ........................ E21B 47/11 250/269.4 |
| 7,805,248 B2 | | 9/2010 | Thigpen et al. | |
| 8,789,587 B2 | | 7/2014 | Tubel et al. | |
| 2015/0233232 A1 | | 8/2015 | Rodney et al. | |
| 2015/0233234 A1 | * | 8/2015 | Jannin | ................... E21B 49/087 324/355 |
| 2016/0178785 A1 | | 6/2016 | Wilson et al. | |

OTHER PUBLICATIONS

Wang et al. ("Derivation of Archie's law based on a fractal pore volume" Geophys. J. Int. (2017) 209, 1403-1407, doi: 10.1093/gji/ggx095, Advance Access publication, Mar. 8, 2017, GJI Marine geosciences and applied geophysics) ( Year: 2017).*

International Searching Authority, The International Search Report and Written Opinion, International Application No. PCT/US2016/065702, which is a PCT parent of the instant application, dated Aug. 25, 2017.

Gong Li Wang, Tom Barber, Peter Wu, David Allen, and Aria Abubakar, Schlumberger, Triaxial induction tool response in dipping and crossbedded formations, SEG Denver 2014 Annual Meeting, pp. 585-590.

* cited by examiner

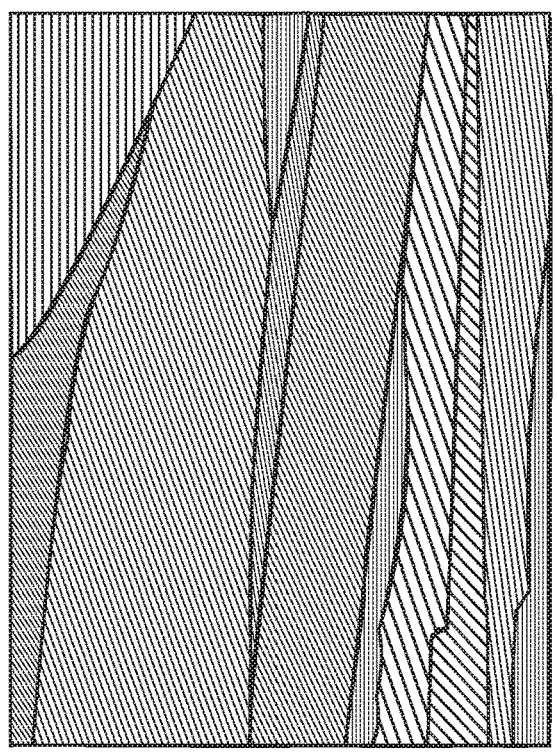
FIG. 2D
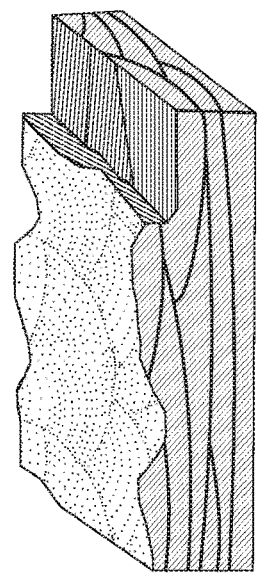
FIG. 2C
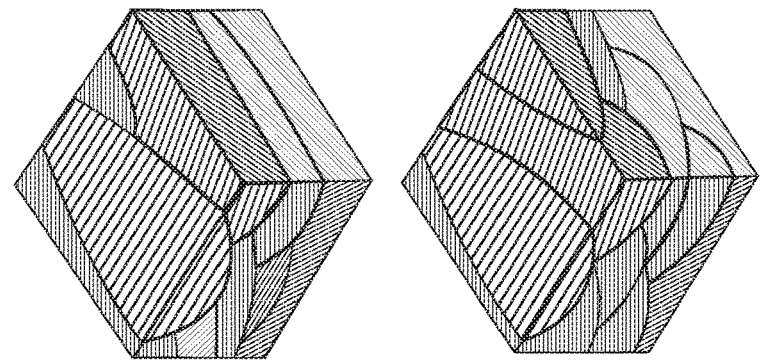

DETECTING A FLOOD FRONT IN A CROSS BED ENVIRONMENT

BACKGROUND

A producing well is drilled into underground earth formations for the production of hydrocarbons (such as oil and gas). It may be useful to inject a fluid into an offset well near the producing well to urge the hydrocarbons through the underground earth formations toward the producing well. The fluid being driven from the offset well to the producing well defines a flood front that travels through the underground earth formations containing the hydrocarbons and other nearby formations. It is desirable to recover fluids from sections of the producing well when the hydrocarbons are present and stop recovering fluids from sections of the producing well before the flood front reaches them. Smart well technology provided by Halliburton provides the ability to open and close production from sections of the producing well on command. Conventionally, the location of the flood front has been estimated using seismic or electromagnetic monitoring. Seismic monitoring suffers from low resolution and is relatively expensive to operate. Electromagnetic monitoring, on the other hand, assumes a non-cross bedding model, i.e., a model in which it is assumed that the layering and anisotropy of the formations are aligned. Accurate detection of a flood front in a cross-bedding environment, in which the layering and anisotropy of the formations are not aligned, is a challenge.

BRIEF DESCRIPTION OF THE DRAWINGS

FIG. 2C is a cross-sectional perspective view of examples of cross bedding.

FIG. 2D is a cross-sectional plan view of an example of cross bedding.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Further, while this disclosure describes a land-based production system, it will be understood that the equipment and techniques described herein are applicable in sea-based systems, multi-lateral wells, all types of production systems, all types of rigs, measurement while drilling ("MWD")/logging while drilling ("LWD") environments, wired drill pipe environments, coiled tubing (wired and unwired) environments, wireline environments, and similar environments.

Figure 1:
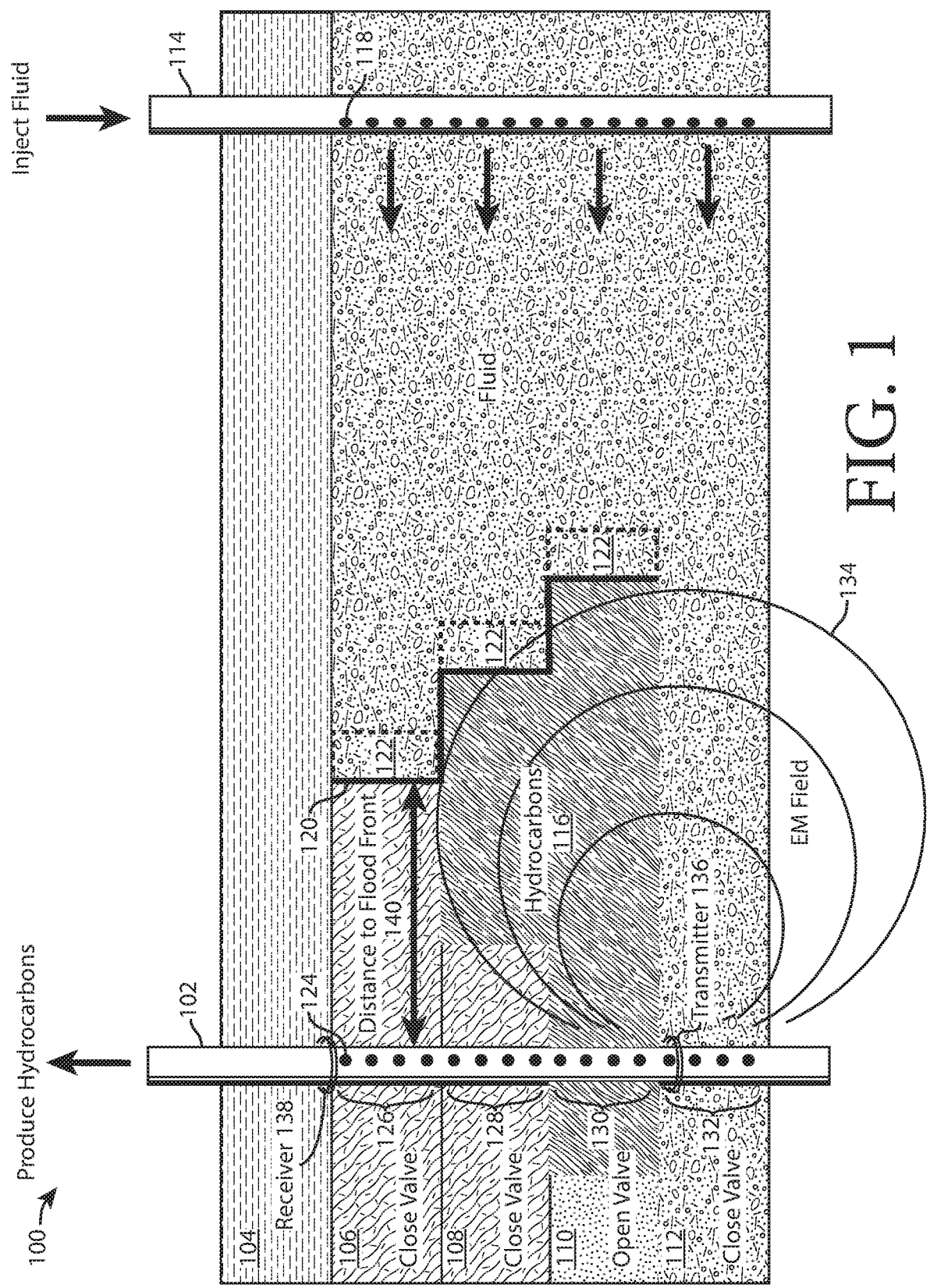
FIG. 1 is a representation of a fluid flood application.

FIG. 1 is a representation of a fluid flood application. In a fluid flood application 100, a producing well 102 (or production string) penetrates several underground formations 104, 106, 108, 110, 112. An offset well 114 penetrates the same formations 104, 106, 108, 110, 112. Hydrocarbons 116 are located in two of the formations 108, 110. A fluid (e.g., a liquid such as water or a gas such as steam) is injected into the offset well 114 and exits through ports 118 (only one port 118 is labeled) in the offset well 114 into the formations 104, 106, 108, 110, 112 forming a flood front 120, which is a surface on the leading edge of the flood. A transition zone 122, typically about 5 feet thick, is on the flood side of the flood front 120. Ports 118 may be comprised of perforations, openings, chokes, or slots and may have mechanisms that allow control of flow rates from the surface. The flood front 120 urges the hydrocarbons 116 toward the producing well 102. One goal of a fluid flood application 100 is to maximize production of hydrocarbons from the producing well 102 while minimizing the production of the production agents, such as the fluids injected into the offset well 114.

The producing well 102 includes ports 124 (only one port 124 is labeled) through which fluids are drawn into the producing well 102 and transported to the surface. The ports 124 are divided into sections 126, 128, 130, 132 that can be opened, by opening a valve (not shown), or closed, by closing the valve, from a control system (not shown) located in the producing well 102 or on the surface. That is, the ports 124 in section 126 can be opened or closed independently of the ports 124 in section 128, the ports 124 in section 126 can be opened or closed independently of the ports 124 in section 130, the ports 124 in section 126 can be opened or closed independently of the ports 124 in section 132, the ports 124 in section 128 can be opened or closed independently of the ports 124 in section 126, the ports 124 in section 128 can be opened or closed independently of the ports 124 in section 130, the ports 124 in section 128 can be opened or closed independently of the ports 124 in section 132, the ports 124 in section 130 can be opened or closed independently of the ports 124 in section 126, the ports 124 in section 130 can be opened or closed independently of the ports 124 in section 128, the ports 124 in section 130 can be opened or closed independently of the ports 124 in section 132, the ports 124 in section 132 can be opened or closed independently of the ports 124 in section 126, the ports 124 in section 132 can be opened or closed independently of the ports 124 in section 128, and the ports 124 in section 132 can be opened or closed independently of the ports 124 in section 130. The goal of maximizing production of hydrocarbons and minimizing production of production agents is addressed by selectively opening and closing the ports 124 in sections 126, 128, 130, and 132.

In a fluid flood application such as illustrated in FIG. 1, early detection of the flood front 120 in each section of the well combined with use of smart well technology (i.e., the ability to selectively open and close valves in sections, e.g., sections 126, 128, 130 and 132) can assist in the minimization of injection fluid production and yield significant cost savings. One conventional approach for early detection of flood fronts 120 is to use electromagnetic fluid flood monitoring where an electromagnetic pulse 134 is transmitted by a transmitter 136, scattered fields from the flood front 120 are received by a receiver 138, and the distance to the flood front (DTFF) 140 is calculated.

In the conventional approach only a non-cross bedding model is used, which may not be realistic for complex geologies. It may lead to inaccurate determination of DTFF 140. It may also lead to inaccurate hydrodynamic calculation of flood front 120 movement (both shape and speed) due to the cross-bed nature of the layering not being incorporated into the model. This may lead to closing of the ports 124 too early or late.

Figure 2B:
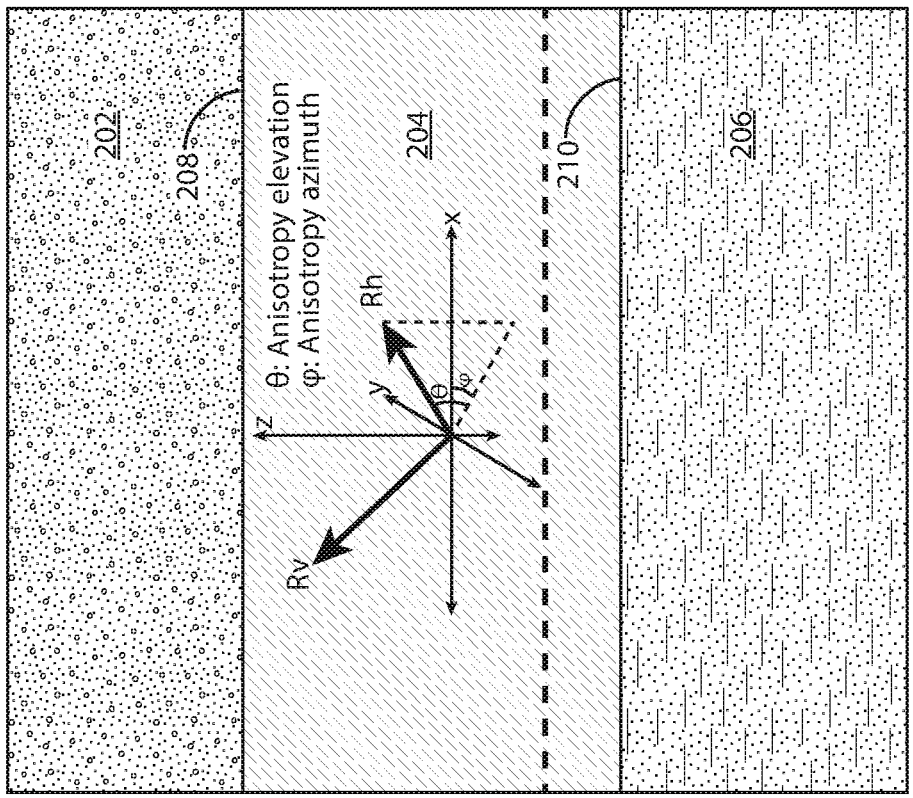
FIG. 2B is a cross-sectional view of a cross-bedding formation.
Figure 2A:
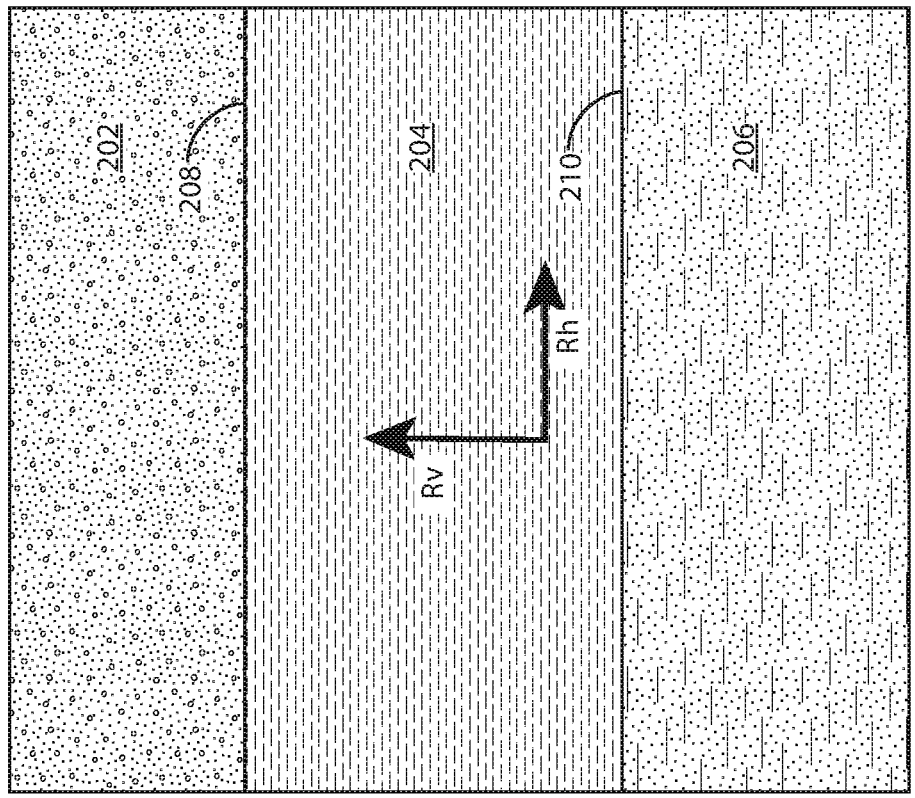
FIG. 2A is a cross-sectional view of a non-cross bedding formation.

FIG. 2A is a cross-sectional view of non-cross bedding formations. FIG. 2A shows three layers 202, 204, 206, with layers 202 and 204 separated by boundary 208 and layers 204 and 206 separated by boundary 210. The anisotropy of layer 204 is represented by a vertical vector labeled Rv and a horizontal vector labeled Rh. The direction of Rv represents the direction in which a parameter, such as vertical resistivity, associated with the layer 204 is measured, which is represented by the magnitude of Rv. The direction of Rh represents the direction, different from the direction of Rv, in which a parameter, such as horizontal resistivity, associated with the layer 204 is measured, which is represented by the magnitude of Rh. In the example shown in FIG. 2A, Rv is perpendicular to Rh and Rh is parallel to boundaries 208 and 210.

Use of a non-cross bedding formation model, in which it is assumed that the layering and anisotropy of the formations are aligned, would be appropriate in the situation illustrated in FIG. 2A.

FIG. 2B is a cross-sectional view of a cross-bedding formation. FIG. 2C is a cross-sectional perspective view of examples of cross bedding. FIG. 2D is a cross-sectional plan view of an example of cross bedding. FIG. 2B shows the same three layers 202, 204, 206 separated by boundaries 208, 210 as in FIG. 2A except that in FIG. 2B layer 204 is a cross bed formation. That is, in FIG. 2B the vectors Rv and Rh representing the anisotropy of formation 204 are not aligned with the boundaries 208, 210. Instead, the vector Rh makes an angle θ with respect to the boundaries 208 and 210. Note that FIGS. 2A and 2B are two dimensional. In three dimensions, the vector Rh may make a three dimensional angle with the boundaries 208, 210 having, using a polar coordinate system as an example, an elevation component θ and an azimuth component ϕ. Using a non-cross bedding formation model in the example shown in FIG. 2B results in reduced accuracy in estimating the water saturation, the distance to the flood front, and the shape and break-through timing of the flood front.

Conventional fluid flood processing using a non-cross bedding formation model is expanded to include a cross-bedding formation model, which leads to more accurate flood front distance and fluid saturation estimations and allows optimization of fluid flood monitoring in complex geologies.

Cross-Bed Parameterization

Figure 3:
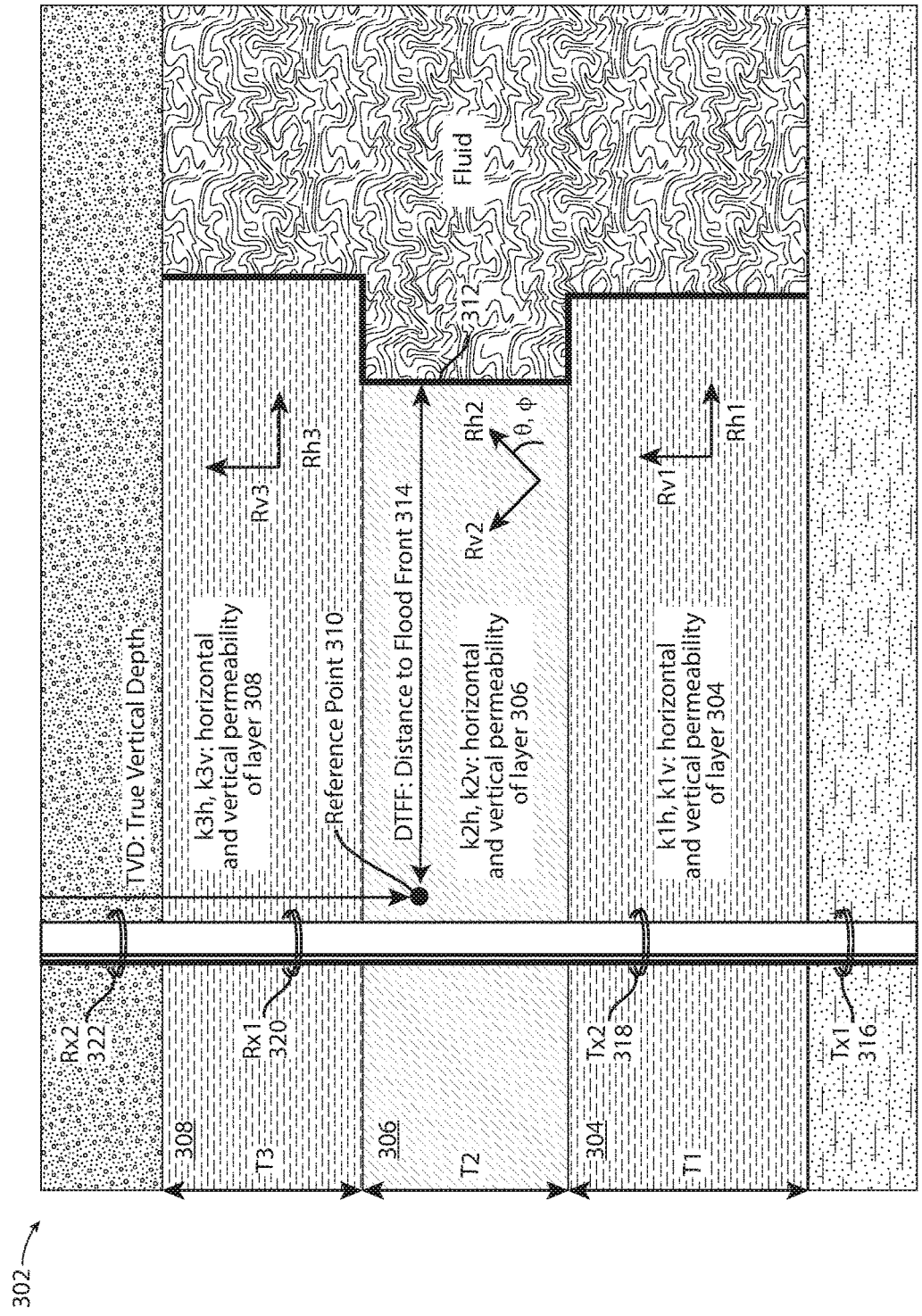
FIG. 3 is a representation of a parametric model of a fluid flood application.

FIG. 3 is a representation of a parametric model of a fluid flood application. The parametric model 302 has three layers 304, 306, 308 and a reference point 310. The parameters of interest are:

Reference point 310 TVD (True Vertical Depth),
Distance to the flood front 312 from the reference point 310 (DTFF 314),
The thickness of the layers 304, 306, 308 (T1, T2, T3, respectively),
The horizontal and vertical mechanical permeability of the layers 304, 306, 308 (k1$h$, k1$v$, k2$h$, k2$v$, k3$h$, k3$v$, respectively),
The vertical and horizontal resistivity of the layers 304, 306, 308 (Rh1, Rv1, Rh2, Rv2, Rh3, Rv3), and
Angle of the cross bed layer containing the reference point (θ,ϕ).

DTFF can be used to detect fluid floods. The speed of approach of the fluid flood can be estimated through time series analysis of DTFF. Permeability can be an output of the workflow as described in connection with FIG. 4 below.

Cross-Bed Workflow

Figure 4:
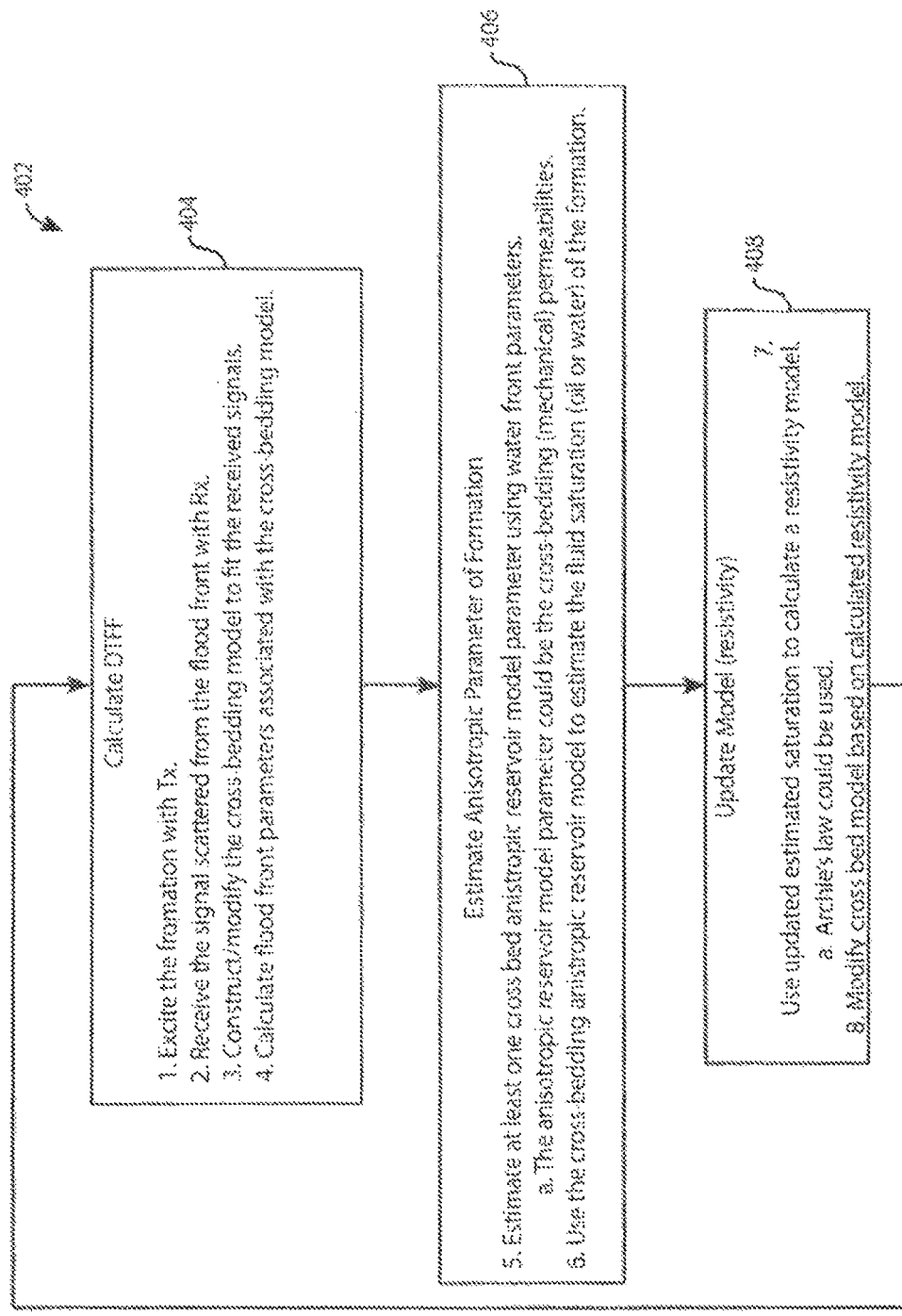
FIG. 4 is a flow chart showing a work flow for calculating the distance to the flood front and permeability.

FIG. 4 is a flow chart showing a work flow for calculating the distance to the flood front and permeability. The work flow 402 includes three procedures which are performed iteratively: calculate DTFF using the cross-bedding model (block 404), estimate an anisotropic parameter of the formation (block 406), and update the cross-bedding model (block 408).

To calculate DTFF and permeability using the cross-bedding model (402), the formation 306 (see FIG. 3) is excited by transmitters Tx1 316 and Tx2 318 (see FIG. 3) (block 404, element 1) and signals that are scattered from the flood front are received at receivers Rx1 320 and Rx2 322 (see FIG. 3) (block 404, element 2). In one or more embodiments, independent measurements are made for each combination of receiver and transmitter (i.e. transmit from Tx1 316 and receive with Rx1 320, transmit from Tx1 316 and receive with Rx2 322, transmit from Tx2 318 and receive with Rx1 320, and transmit from Tx2 318 and receive with Rx2 322) to increase the diversity of information channels used and to produce a robust inversion process. In one or more embodiments, measurement of the multiple channels may be time or frequency multiplexed. That is, transmissions from Tx1 316 may be time multiplexed with transmissions from Tx2 318 and/or Rx1 320 and Rx2 322 may be sampled in multiplexed time slots. Alternatively, Tx1 316 may transmit on one frequency, Tx2 318 may transmit on a second frequency different from the first frequency, and Rx1 320 and Rx2 322 may receive on one or both of the first frequency and the second frequency.

A cross-bedding model of the formation is constructed from calculations based on the received signals (or, after the first iteration of the iterative process illustrated in FIG. 4, the cross-bedding model is modified to fit the received signals) as described above in connection with FIG. 3 (block 404, element 3). Parameters of the cross bed model are adjusted through an inversion process, described below in connection with FIG. 5, until a good match between the measured and modeled signals is obtained. Flood front parameters associated with the cross-bedding model are then calculated (block 404, element 4).

At least one cross-bedding anisotropic reservoir model parameter is then estimated using flood front parameters from the cross-bedding model (block 406, element 5). In one example, the cross-bedding anisotropic reservoir model parameters are horizontal and vertical permeabilities (block 406, element 5.a) and the direction of anisotropy is obtained from the direction of cross bedding. Here the words horizontal and vertical are not used in relationship to layering or earth's coordinate system, but used in a sense analogous to that in FIG. 2B. Permeability is measured in one way along one direction (which is denoted as the "vertical" direction) and in a different way in the two other perpendicular directions (which are denoted as the "horizontal" directions;

note that the way to determine permeability is the same for both horizontal directions). The direction of cross bedding may be determined by a second inversion where the dynamic reservoir model is adjusted until a good match is obtained, as described below in connection with FIG. 6. The estimated fluid saturation is then estimated using the dynamic reservoir model (block 406, element 6).

The estimated fluid saturation is then used to calculate a resistivity model (block 408, element 7) that can be converted to resistivity through, for example, Archie's Law (block 408, element 7.a). The resulting resistivity may be fed back to the resistivity inversion as an initial guess or a constraint (i.e., returning processing to block 404). This process can be repeated until difference of results between two subsequent iterations are below a threshold (e.g., 1 percent, 5 percent, or 10 percent).

Data Acquisition

A measured signal is acquired by transmitting an electromagnetic (EM) signal from Tx1 316 or Tx2 318 (see FIG. 3). The signal scattered from the target (i.e., the flood front 312) is received, measured, and recorded by the receivers Rx1 320 and Rx2 322. The duration of a single EM measurement is on the order of seconds (at high frequencies) or minutes (at lower frequencies). The actual physical quantity received by the receivers is typically a voltage and is a function of the parameters listed above in connection with the description of FIG. 3:

$$V_{RX}=f(Rv,Rh,\text{DTFF},\theta,\phi) \quad (1)$$

The parametric cross-bedding model 302, i.e., $V_{Rx}$, represents the environment illustrated in FIG. 3 expressed through Maxwell's Equations. As previously mentioned, $V_{Rx}$ can be expressed as a function of time:

$$V_{Rx}(t)=f(Rv,Rh,\text{DTFF},\theta,\phi,t) \quad (2)$$

A more sophisticated model can be constructed by adding additional parameters and increasing the degree of freedom, but DTFF, $\theta$, and $\phi$ are preferably included. The spacing between the transmitters and receivers determines the range of the system and is typically between 2 feet and 100 feet. The frequency of operation is between DC and 2 MegaHertz (MHz). For electrode based systems, frequencies in the lower range are used to achieve low attenuation. In coil based systems, higher frequencies are used to produce signals of sufficient magnitude. An optimum frequency to achieve a 50 foot range is around 10 kiloHertz (kHz).

Inversion Workflow

Figure 5:
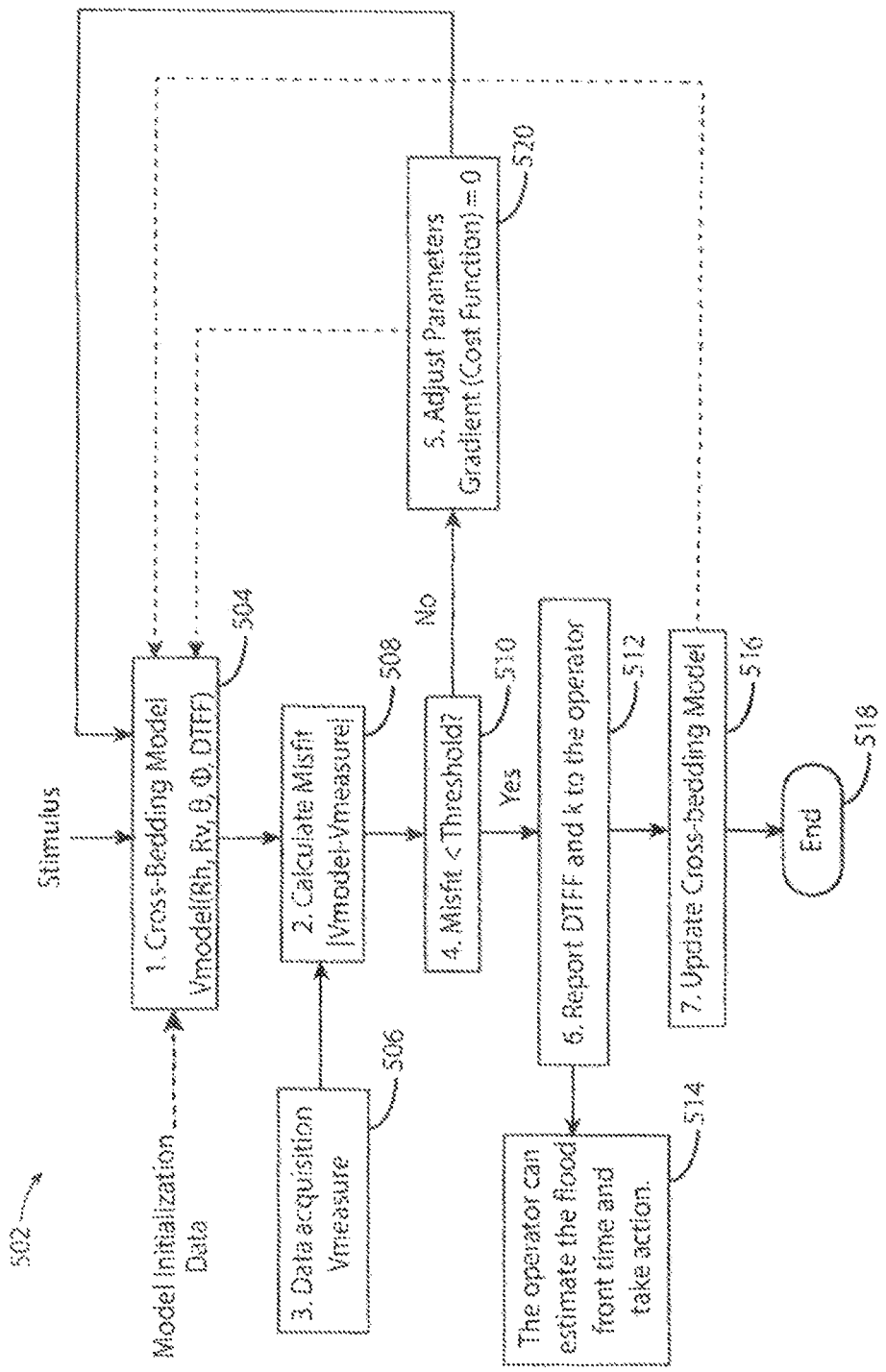
FIG. 5 is a flow chart showing the inversion work flow for fitting a measured signal to a modeled signal.

FIG. 5 is a flow chart showing the inversion work flow 502 for fitting a measured signal to a modeled signal. A cross-bedding model 504 is initialized (initialization, updates and adjustments to the cross-bedding model 504 are indicated by dashed lines on FIG. 5 and FIG. 6) based on model initialization data, such as logging from the producing well 102 or nearby wells, or based on an initial set of transmissions from the transmitters Tx1 316 and/or Tx2 318 and receptions by the receivers Rx1 320 and/or Rx2 322 and subsequent processing. The cross-bedding model 504 is then evaluated by applying a stimulus, i.e., a value representative of an electromagnetic signal to be transmitted from the transmitters Tx1 316 and/or Tx2 318, to produce an output Vmodel. Data is acquired from the formation 306 using the transmitters Tx1 316 and/or Tx2 318 and receivers Rx1 320 and/or Rx2 322 to produce Vmeasure (block 506). A misfit between the output of the cross-bedding model 504 and the acquired data is then calculated as |Vmodel−Vmeasure| (block 508). The misfit is then compared to a threshold (block 510). If the misfit is less than the threshold ("Yes" branch from block 510), meaning that the output of the cross-bedding model 504 is within a threshold amount of the value acquired through the data measurement, DTFF, kh (horizontal permeability) and kv (vertical permeability) are calculated and reported to an operator (block 512) who can then estimate the flood front time and take action (block 514). For example, in the situation shown in FIG. 1, the operator may decide that the DTFF 140 in formation 110 is large enough that it is safe to keep the ports 124 in section 130 open or the operator may decide that the DTFF in formation 110 is too small to be safe, i.e., it is so small that it jeopardizes the goal of maximizing production of hydrocarbons (such as oil) and minimizing production of production agents (such as water), and close the ports 124 in section 130. Processing continues by updating the cross-bedding model 504 as needed to reduce the difference between Vmodel and Vmeasure (block 516). Processing then ends for this iteration (block 518).

If the misfit is not less than the threshold ("No" branch from block 510), the parameters of the cross-bedding model 504 are iteratively adjusted to urge the gradient of a cost function evaluating the parameters of the model toward zero (block 520). Processing then returns to block 504.

In addition, multiple measurements may be taken to produce a time series to allow observation of the movement of flood front over time. Such movement may have a time scale of hours, days, or months. The speed and shape of the flood front depends on formation porosity and permeability, initial water saturations, and injection pressure.

Figure 6:
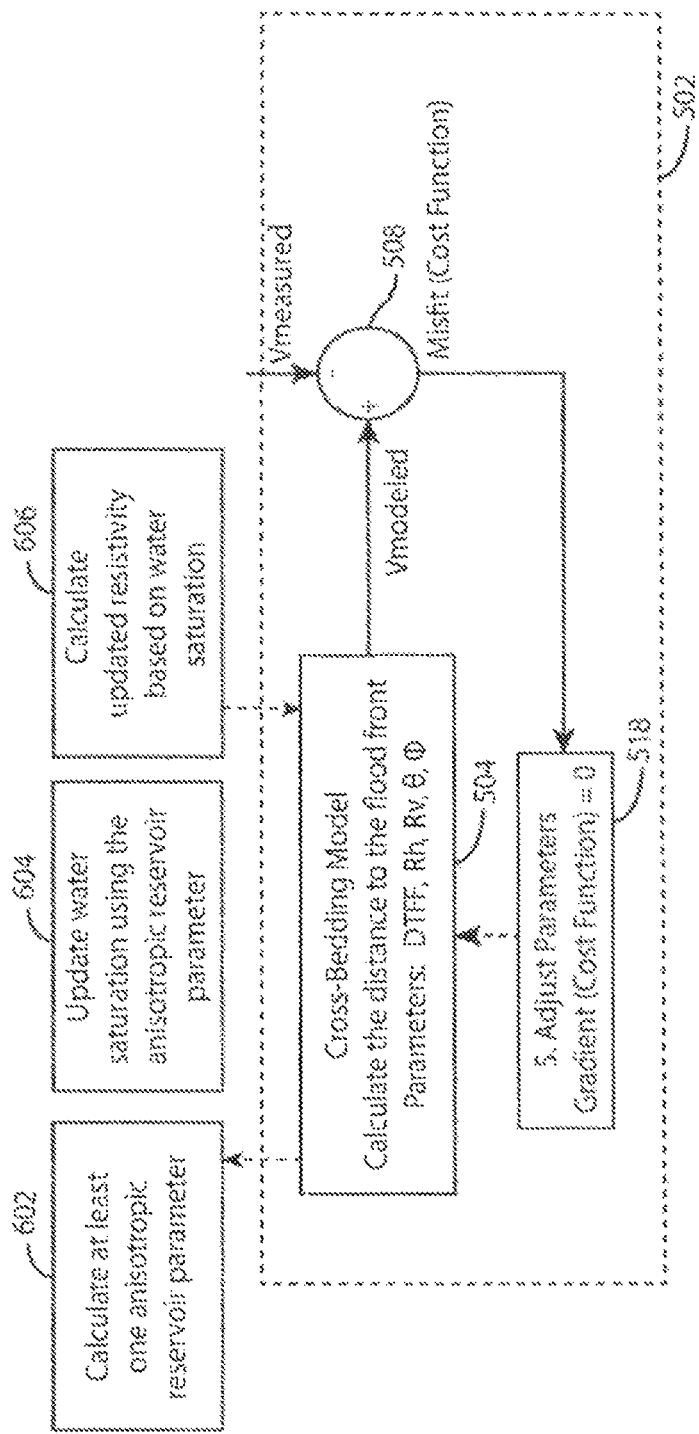
FIG. 6 is a flow chart showing interfacing between electromagnetic inversion and reservoir inversion.

FIG. 6 is a flow chart showing interfacing between electromagnetic inversion and reservoir inversion. The electromagnetic inversion loop 502 minimizes the misfit between the measured and modeled signal as described in more detail in connection with FIG. 5 (a simplified version of the loop described in connection with FIG. 5 is shown in FIG. 6). Cross-bedding model 504 parameters obtained from the electromagnetic inversion loop 502 can be used to calculate an anisotropic reservoir parameter (block 602). For example:

The $\theta$ and $\phi$ parameters from the inversion can be used as the anisotropy angles for horizontal mechanical permeability kh and vertical mechanical permeability kv.

The resistivity anisotropy Rv/Rh parameters can be used to calculate the permeability anisotropy $\mu v/\mu h$.

Further, the resistivity anisotropy Rv/Rh can be fed to a sand/shale analysis to calculate water saturation and volume of sand (block 604). These parameters can be subsequently used in the reservoir simulation either directly, or after conversion to an anisotropic permeability. After the anisotropic reservoir model is calculated, it can be used to calculate resistivity and that can be fed back to the inversion completing a loop (block 606).

Figure 7:
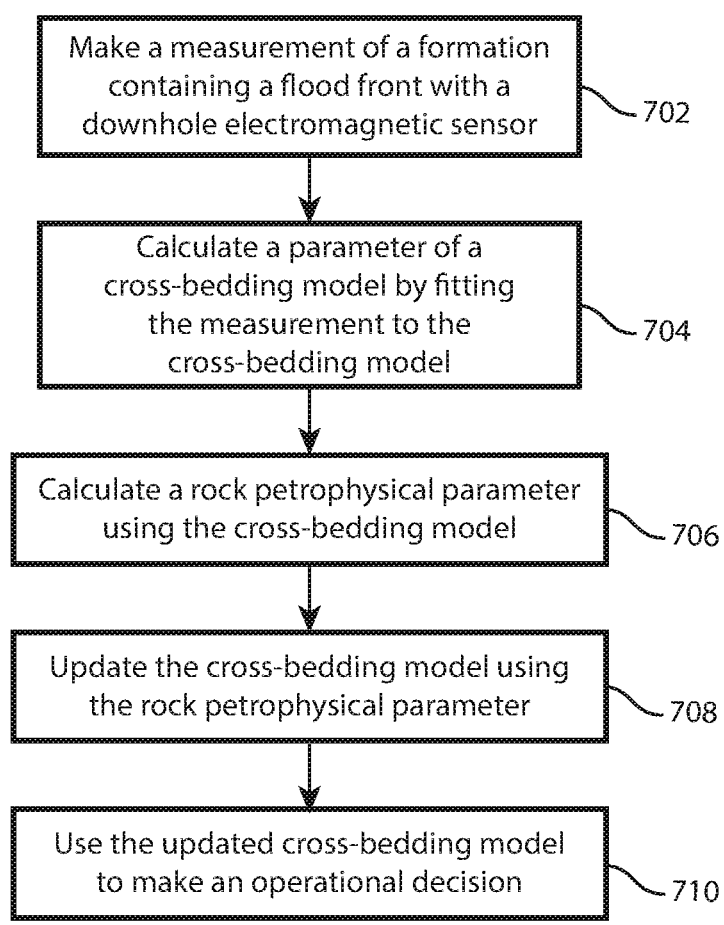
FIG. 7 is a flow chart showing the cross-bedding model in use.

FIG. 7 is a flow chart showing the cross-bedding model 504 in use. A measurement of a formation containing a flood front is made with a downhole electromagnetic sensor (block 702), where the downhole electromagnetic sensor may include the transmitter Tx1 316 and/or the transmitter Tx2 318 and the receiver Rx1 320 and/or the receiver Rx2 322. A parameter of the cross-bedding model 504 is calculated by fitting the measurement to the cross-bedding model (block 704), as illustrated in FIG. 5. The cross-bedding model 504 is then used to calculate a rock petrophysical parameter (block 706), as illustrated in FIG. 6, such as permeability, resistivity, resistivity anisotropy, cross-bed anisotropic permeability, and other similar rock petrophysical parameters. The cross-bedding model 504 is then updated using the rock petrophysical parameter (block 708), such as using the rock petrophysical parameter to update resistivity anisotropy (Rh and Rv) in the cross-bedding model 504. The updated cross-bedding model 504 is then used to make an operational decision (block 710). Examples of operational decisions are (a) closing a valve in a producing well to maximize hydrocarbons and minimize production agents, such as water or other fluids being injected into the offset well, (b) opening a valve in a producing well to maximize hydrocarbons and minimize production agents.

In one aspect, a method includes making a measurement of a formation containing a flood front with a downhole electromagnetic sensor. The method includes calculating a parameter of a cross-bedding model by fitting the measurement to the cross-bedding model. The method includes calculating a rock petrophysical parameter using the cross-bedding model. The method includes updating the cross-bedding model using the rock petrophysical parameter. The method includes using the updated cross-bedding model to make an operational decision.

Implementations may include one or more of the following. Making a measurement with a downhole electromagnetic sensor may include exciting a formation adjacent to the downhole electromagnetic sensor with an electromagnetic signal from a downhole electromagnetic transmitter to produce a signal scattered from the formation and measuring the signal scattered from the formation to produce the measurement. Calculating the parameter of the cross-bedding model by fitting the measurement to the cross-bedding model may include adjusting the cross-bedding model to minimize a misfit between the measurement and a predicted measurement calculated by the cross-bedding model and calculating the parameter of the cross-bedding model from the adjusted cross-bedding model. The predicted measurement may be calculated by inputting into the cross-bedding model a value representative of an electromagnetic signal to be transmitted from a downhole electromagnetic transmitter. The parameter of the cross-bedding model may be selected from the group of cross-bedding model parameters consisting of vertical resistivity (Rv), horizontal resistivity (Rh), distance to the flood front (DTFF), cross-bedding elevation ($\theta$), and cross-bedding azimuth ($\phi$). The rock petrophysical parameter may be selected from the group consisting of cross-bed anisotropic permeability, porosity, and resistivity. Calculating a rock petrophysical parameter using the cross-bedding model may include using a petrophysical relationship to calculate a water/oil saturation from cross-bedding model parameters and calculating rock petrophysical parameters using a reservoir model and water/oil saturations. The petrophysical relationships may include at least one anisotropic reservoir parameter. The petrophysical relationships may include horizontal resistivity (Rh) and vertical resistivity (Rv). Updating the cross-bedding model using the rock petrophysical parameter may include calculating water/oil saturation using the rock petrophysical parameter and updating the cross-bedding model from the petrophysical relationships and the water/oil saturation. The operational decision may be to close a valve in a production string. The operational decision may be to close a valve in a production string to maximize hydrocarbons and minimize production agents. The operational decision may be to open a valve in a production string to maximize hydrocarbons and minimize production agents. The method may include using the reservoir model to calculate future values of oil/water saturation and wherein the operational decision is made using the future values of oil/water saturation.

In one aspect, a non-transitory computer-readable medium contains a computer program that, when executed, performs a method including making a measurement of a formation containing a flood front with a downhole electromagnetic sensor. The method includes calculating a parameter of a cross-bedding model by fitting the measurement to the cross-bedding model. The method includes calculating a rock petrophysical parameter using the cross-bedding model. The method includes updating the cross-bedding model using the rock petrophysical parameter. The method includes using the updated cross-bedding model to make an operational decision.

Implementations may include one or more of the following. Making a measurement with a downhole electromagnetic sensor may include exciting a formation adjacent to the downhole electromagnetic sensor with an electromagnetic signal from a downhole electromagnetic transmitter to produce a signal scattered from the formation and measuring the signal scattered from the formation to produce the measurement. Calculating the parameter of the cross-bedding model by fitting the measurement to the cross-bedding model may include adjusting the cross-bedding model to minimize a misfit between the measurement and a predicted measurement calculated by the cross-bedding model and calculating the parameter of the cross-bedding model from the adjusted cross-bedding model. The predicted measurement may be calculated by inputting into the cross-bedding model a value representative of an electromagnetic signal to be transmitted from a downhole electromagnetic transmitter. The parameter of the cross-bedding model may be selected from the group of cross-bedding 15 model parameters consisting of vertical resistivity (Rv), horizontal resistivity (Rh), distance to the flood front (DTFF), cross-bedding elevation ($\theta$), and cross-bedding azimuth ($\phi$). The rock petrophysical parameter may be selected from the group consisting of cross-bed anisotropic permeability, porosity, and resistivity. Calculating a rock petrophysical parameter using the cross-bedding model may include using a petrophysical relationship to calculate a water/oil saturation from cross-bedding model parameters and calculating rock petrophysical parameters using a reservoir model and water/oil saturations. The petrophysical relationships may include at least one anisotropic reservoir parameter. The petrophysical relationships may include horizontal resistivity (Rh) and vertical resistivity (Rv). Updating the cross-bedding model using the rock petrophysical parameter may include calculating water/oil saturation using rock petrophysical parameter and updating the cross-bedding model from the petrophysical relationships and the water/oil saturation. The operational decision may be to close a valve in a production string. The operational decision may be to close a valve in a production string to maximize hydrocarbons and minimize production agents. The operational decision may be to open a valve in a production string to maximize hydrocarbons and minimize production agents. The method may include using the reservoir model to calculate future values of oil/water saturation. The operational decision may be made using the future values of oil/water saturation.

In one aspect, a method includes making a measurement of a flood front formation containing a flood front with a downhole electromagnetic sensor in a producing well. The producing well has a plurality of sections of ports for receiving fluids. Each of the sections of ports is openable and closable independent of the other sections of ports. One of the plurality of sections is located so that its ports align with the flood front formation. The method includes calculating a parameter of a cross-bedding model by fitting the measurement to the cross-bedding model. The method includes calculating a rock petrophysical parameter using the cross-bedding model. The method includes updating the cross-bedding model using the rock petrophysical parameter. The method includes using the updated cross-bedding model to make an operational decision. The operational decision includes closing the ports in the one of the plurality of sections being located so that its ports align with the flood front formation.

Implementations may include one or more of the following. Making a measurement with a downhole electromagnetic sensor includes exciting a formation adjacent to the downhole electromagnetic sensor with an electromagnetic signal from a downhole electromagnetic transmitter to produce a signal scattered from the formation and measuring the signal scattered from the formation to produce the measurement. Calculating the parameter of the cross-bedding model by fitting the measurement to the cross-bedding model includes adjusting the cross-bedding model to minimize a misfit between the measurement and a predicted measurement calculated by the cross-bedding model and calculating the parameter of the cross-bedding model from the adjusted cross-bedding model. The predicted measurement may be calculated by inputting into the cross-bedding model a value representative of an electromagnetic signal to be transmitted from a downhole electromagnetic transmitter. The parameter of the cross-bedding model may be selected from the group of cross-bedding model parameters consisting of vertical resistivity (Rv), horizontal resistivity (Rh), distance to the flood front (DTFF), cross-bedding elevation ($\theta$), and cross-bedding azimuth ($\phi$). The rock petrophysical parameter may be selected from the group consisting of cross-bed anisotropic permeability, porosity, and resistivity. Calculating a rock petrophysical parameter using the cross-bedding model may include using a petrophysical relationship to calculate a water/oil saturation from cross-bedding model parameters and calculating rock petrophysical parameters using a reservoir model and water/oil saturations. The petrophysical relationships may include at least one anisotropic reservoir parameter. The petrophysical relationships may include horizontal resistivity (Rh) and vertical resistivity (Rv). Updating the cross-bedding model using the rock petrophysical parameter may include calculating water/oil saturation using the rock petrophysical parameter and updating the cross-bedding model from the petrophysical relationships and the water/oil saturation. The operational decision may be to close a valve in a production string. The operational decision may be to close a valve in a production string to maximize hydrocarbons and minimize production agents. The operational decision may be to open a valve in a production string to maximize hydrocarbons and minimize production agents. The method may include using the reservoir model to calculate future values of oil/water saturation. The operational decision may be made using the future values of oil/water saturation.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method comprising:
   making a measurement of a formation containing a flood front with a downhole electromagnetic sensor;
   determining one or more cross-bedding model parameters of a cross-bedding model of the formation by fitting the measurement to the cross-bedding model;
   determining a reservoir model using the one or more cross-bedding model parameters;
   calculating a rock petrophysical parameter using the reservoir model and the cross-bedding model;
   updating one or more cross-bedding model parameters of the cross-bedding model using the rock petrophysical parameter;
   calculating a distance to flood front (DTFF) using the updated cross-bedding model; and
   using the DTFF to make an operational decision.

2. The method of claim 1 wherein making a measurement with a downhole electromagnetic sensor comprises:
   exciting a formation adjacent to the downhole electromagnetic sensor with an electromagnetic signal from a downhole electromagnetic transmitter to produce a signal scattered from the formation; and
   measuring the signal scattered from the formation to produce the measurement.

3. The method of claim 1 wherein calculating the one or more cross-bedding model parameters of the cross-bedding model by fitting the measurement to the cross-bedding model comprises:
   adjusting the cross-bedding model to minimize a misfit between the measurement and a predicted measurement calculated by the cross-bedding model; and
   calculating the one or more cross-bedding model parameters of the cross-bedding model from the adjusted cross-bedding model.

4. The method of claim 1 wherein calculating the rock petrophysical parameter comprises:
   using a petrophysical relationship to calculate a water/oil saturation from the cross-bedding model; and
   calculating the rock petrophysical parameter using the reservoir model and the water/oil saturation.

5. The method of claim 1 wherein updating the cross-bedding model using the rock petrophysical parameter comprises:
   calculating water/oil saturation using the rock petrophysical parameter; and
   updating the cross-bedding model from a petrophysical relationship and the water/oil saturation.

6. The method of claim 1 wherein the operational decision is selected from a group of operational decisions consisting of closing a valve in a production string, closing a valve in a production string to maximize hydrocarbons and minimize production agents, and opening a valve in a production string to maximize hydrocarbons and minimize production agents.

7. The method of claim 1 further comprising:
   using the reservoir model to calculate future values of oil/water saturation; and
   wherein the operational decision is made using the future values of oil/water saturation.

8. The method of claim 1, wherein the one or more cross-bedding model parameters include at least one parameter selected from a group consisting of vertical resistivity (Rv), horizontal resistivity (Rh), the DTFF, cross-bedding elevation ($\theta$), and cross-bedding azimuth ($\phi$).

9. The method of claim 1, further comprising:
determining a misfit between the measurement and a predicted measurement calculated by the cross-bedding model; and
iteratively performing said determining the cross-bedding model, determining the reservoir model, calculating the rock petrophysical parameter, and updating the one or more cross-bedding model parameters until the misfit is below a threshold.

10. A non-transitory computer-readable medium on which is recorded a computer program, the computer program comprising executable instructions, that, when executed, perform a method comprising:
making a measurement of a formation containing a flood front with a downhole electromagnetic sensor;
determining one or more cross-bedding model parameters of a cross-bedding model of the formation by fitting the measurement to the cross-bedding model;
determining a reservoir model using the one or more cross-bedding model parameters;
calculating a rock petrophysical parameter using the reservoir model and the cross-bedding model;
updating one or more cross-bedding model parameters the cross-bedding model using the rock petrophysical parameter;
calculating a distance to flood front (DTFF) using the updated cross-bedding model; and
using the DTFF to make an operational decision.

11. The non-transitory computer-readable medium of claim 10 wherein making a measurement with a downhole electromagnetic sensor comprises:
exciting a formation adjacent to the downhole electromagnetic sensor with an electromagnetic signal from a downhole electromagnetic transmitter to produce a signal scattered from the formation; and
measuring the signal scattered from the formation to produce the measurement.

12. The non-transitory computer-readable medium of claim 10 wherein calculating the one or more cross-bedding model parameters of the cross-bedding model by fitting the measurement to the cross-bedding model comprises:
adjusting the cross-bedding model to minimize a misfit between the measurement and a predicted measurement calculated by the cross-bedding model; and
calculating the one or more cross-bedding model parameters of the cross-bedding model from the adjusted cross-bedding model.

13. The non-transitory computer-readable medium of claim 10 wherein calculating the rock petrophysical parameter comprises:
using a petrophysical relationship to calculate a water/oil saturation from the cross-bedding model; and
calculating the rock petrophysical parameter using the reservoir model and the water/oil saturation.

14. The non-transitory computer-readable medium of claim 10 wherein updating the cross-bedding model using the rock petrophysical parameter comprises:
calculating a water/oil saturation using the rock petrophysical parameter; and
updating the cross-bedding model from a petrophysical relationship and the water/oil saturation.

15. The non-transitory computer-readable medium of claim 10 wherein the operational decision is selected from a group of operational decisions consisting of closing a valve in a production string, closing a valve in a production string to maximize hydrocarbons and minimize production agents, and opening a valve in a production string to maximize hydrocarbons and minimize production agents.

16. The non-transitory computer-readable medium of claim 10, wherein the method further comprises:
using the reservoir model to calculate future values of oil/water saturation; and
wherein the operational decision is made using the future values of oil/water saturation.

17. A method comprising:
making a measurement of a formation containing a flood front with a downhole electromagnetic sensor in a producing well, the producing well having a plurality of sections of ports for receiving fluids, each of the sections of ports being openable and closable independent of the other sections of ports, one of the plurality of sections being located so that its ports align with the formation;
determining one or more cross-bedding model parameters of a cross-bedding model of the formation by fitting the measurement to the cross-bedding model;
determining a reservoir model using the one or more cross-bedding model parameters;
calculating a rock petrophysical parameter using the reservoir model and the cross-bedding model;
updating one or more cross-bedding model parameters of the cross-bedding model using the rock petrophysical parameter;
calculating a distance to flood front (DTFF) using the updated cross-bedding model; and
using the DTFF to make an operational decision, the operational decision including opening or closing the ports in the one of the plurality of sections being located so that its ports align with the flood front.

18. The method of claim 17 wherein making a measurement with a downhole electromagnetic sensor comprises:
exciting a formation adjacent to the downhole electromagnetic sensor with an electromagnetic signal from a downhole electromagnetic transmitter to produce a signal scattered from the formation; and
measuring the signal scattered from the formation to produce the measurement.

19. The method of claim 17 wherein calculating the one or more cross-bedding model parameters of the cross-bedding model by fitting the measurement to the cross-bedding model comprises:
adjusting the cross-bedding model to minimize a misfit between the measurement and a predicted measurement calculated by the cross-bedding model; and
calculating the one or more cross-bedding model parameters of the cross-bedding model from the adjusted cross-bedding model.

20. The method of claim 17 wherein calculating the rock petrophysical parameter comprises:
using a petrophysical relationship to calculate a water/oil saturation from cross-bedding model; and
calculating rock petrophysical parameter using the reservoir model and the water/oil saturation.

21. The method of claim 17 wherein updating the cross-bedding model using the rock petrophysical parameter comprises:
calculating a water/oil saturation using the rock petrophysical parameter; and
updating the cross-bedding model based on petrophysical relationships and the water/oil saturation.

22. The method of claim 17 wherein the operational decision is selected from a group of operational decisions consisting of closing a valve in a production string, closing a valve in a production string to maximize hydrocarbons and minimize production agents, and opening a valve in a production string to maximize hydrocarbons and minimize production agents.

\* \* \* \* \*